(12) United States Patent
Darwin

(10) Patent No.: US 12,180,628 B2
(45) Date of Patent: Dec. 31, 2024

(54) MULTILAYERED NONWOVEN FABRIC CONTAINING SUBMICRON FIBERS, A METHOD OF MANUFACTURE, AN APPARATUS, AND ARTICLES MADE FROM MULTILAYERED NONWOVEN FABRICS

(71) Applicant: Applied Materials Group LLC, Durham, NC (US)

(72) Inventor: Morgan Darwin, Durham, NC (US)

(*) Notice: Subject to any disclaimer, the term of this patent is extended or adjusted under 35 U.S.C. 154(b) by 0 days.

(21) Appl. No.: 18/395,004

(22) Filed: Dec. 22, 2023

(65) Prior Publication Data

US 2024/0125021 A1     Apr. 18, 2024

Related U.S. Application Data

(62) Division of application No. 16/950,028, filed on Nov. 17, 2020, now Pat. No. 12,098,488.

(51) Int. Cl.
| | |
|---|---|
| *D04H 1/559* | (2012.01) |
| *B32B 5/00* | (2006.01) |
| *B32B 5/26* | (2006.01) |
| *B32B 37/00* | (2006.01) |
| *B32B 37/02* | (2006.01) |
| *B32B 37/15* | (2006.01) |
| *D01D 4/00* | (2006.01) |
| *D01D 5/08* | (2006.01) |
| *D04H 3/16* | (2006.01) |
| *B32B 5/02* | (2006.01) |

(Continued)

(52) U.S. Cl.
CPC ............. *D04H 1/559* (2013.01); *B32B 5/266* (2021.05); *B32B 37/02* (2013.01); *B32B 37/15* (2013.01); *B32B 37/156* (2013.01); *D04H 3/16* (2013.01); *B32B 5/022* (2013.01); *B32B 2305/20* (2013.01); *B32B 2309/12* (2013.01); *B32B 2310/028* (2013.01); *D01D 4/025* (2013.01); *D01D 5/0023* (2013.01); *D01D 5/08* (2013.01); *D04H 1/4374* (2013.01); *D04H 1/43838* (2020.05); *D04H 1/498* (2013.01); *D04H 3/14* (2013.01)

(58) Field of Classification Search
None
See application file for complete search history.

(56) References Cited

FOREIGN PATENT DOCUMENTS

EP     3693500 A1 *  8/2020  ............. B32B 27/12

OTHER PUBLICATIONS

English machine translation of EP 3693500 A1; Krumme; Aug. 12, 2020; 8 pages. (Year: 2020).*

* cited by examiner

*Primary Examiner* — Linda L Gray

(57) ABSTRACT

This document presents a novel method of manufacturing multilayered nonwoven fabrics consisting of submicron fibers, hydroentangled, meltfibrillated, and/or spunlaid web layers. The composite multilayered webs contain one or more submicron fiber webs placed between inner and outer layers of hydroentangled, meltfibrillated, and/or spunlaid web, forming a fabric that may be utilized in the manufacture of articles which serve as barriers, wipes or sorbent materials, or may have other potential applications. The created novel composite multilayered fabric may have increased loft, softness and bending length, may not be solely dependent upon an electrostatic charge to repel small particles and microbes, and may be formed from a broad selection of natural, synthetic, and recycled polymers, including petroleum- and plant-based, allowing polymer selection based on article lifecycle.

6 Claims, 9 Drawing Sheets

(51) Int. Cl.
*D01D 4/02* (2006.01)
*D01D 5/00* (2006.01)
*D04H 1/4374* (2012.01)
*D04H 1/4382* (2012.01)
*D04H 1/498* (2012.01)
*D04H 3/14* (2012.01)

MULTILAYERED NONWOVEN FABRIC CONTAINING SUBMICRON FIBERS, A METHOD OF MANUFACTURE, AN APPARATUS, AND ARTICLES MADE FROM MULTILAYERED NONWOVEN FABRICS

CROSS-REFERENCE TO RELATED APPLICATION

This application claims the benefit as a divisional of U.S. Non-Provisional application Ser. No. 16/950,028, filed Nov. 17, 2020 and entitled "Multilayered nonwoven fabric containing submicron fibers, a method of manufacture, an apparatus, and articles made from multilayered nonwoven fabrics".

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which.

DETAILED DESCRIPTION

Figure 1A:
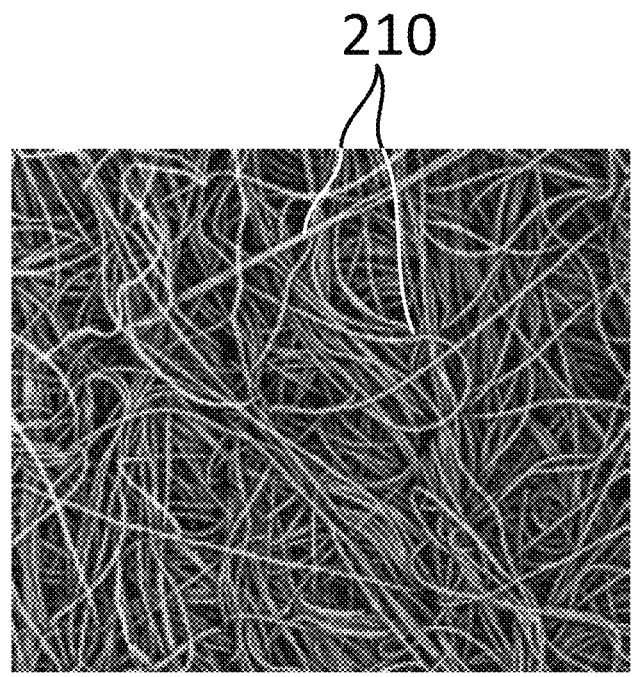
FIG. 1A is a view of a plurality of spunlaid fibers that have been hydroentangled consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although no necessarily directly, and not necessarily mechanically.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

Unless otherwise stated, the words "up", "down", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used herein, "calender" may refer to a machine used to bond fibers of a web or sheets of fabric or film to each other or to create surface features on these sheets. It may consist of two or more heavy cylinders that impart heat and pressure to the sheets that are drawn between them. The rollers may be mirror smooth, embossed with a pattern, or porous.

As use herein, "calender bonding" may refer to a process for thermally bonding webs by passing them through the nip of a pair of rolls, one or both of which are heated. Plain or patterned rolls may be employed. Alternatively, a blanket calender may be used.

As used herein, "calendaring" may refer to a mechanical finishing process used to laminate or to produce special surface features such as high luster, glazing and embossed patterns.

As used in this disclosure, the word "correspond" indicates that a first object is in some manner linked to a second object in a one-to-one relationship or that one or more properties shared by two or more objects match, agree, or align within acceptable manufacturing tolerances.

As use in this disclosure, "horizontal" may be a directional term that refers to a direction that is perpendicular to the local force of gravity. Unless specifically noted in this disclosure, the horizontal direction is always perpendicular to the vertical direction.

As used herein, "fiber" may refer to the basic threadlike structure from which nonwovens are made, having a length at least 100 times its width and may be formed from natural, synthetic, and recycled polymers, including petroleum-and-plant-based, or a combination of the same.

As used herein, "hydroentaglement" may refer to a method of bonding a web of fibers or filaments by entagling them using high-pressure, columnar water jets. As the jets penetrate the web, fiber segments are carried by the highly turbulent fluid and become entangled on a semi-micro scale. In addition to bonding the web, which needs little or no additional binder, the process can also be used to impart a pattern to the web. Webs produced from any and all manufacturing processes which benefit from hydroentanglement are included in this definition; non-limiting examples of included manufacturing processes are melt fibrillation, spunlaid and wet forming.

As used herein, "hydroentangled" may describe a web of fibers or filaments bonded by hydroentangling.

As used herein, "hydroentangled nonwoven" may refer to a web bonded by hydroentanglement to provide fabric integrity. The web may additionally be bonded by other techniques.

As used herein, "melt fibrillation" or "melt fibrillating" may refer to a manufacturing process where a polymeric melt is extruded through a nozzle and a central fluid stream emanating from the orifice aids in the formation of an elongated hollow tube, which is then subjected to an entraining fluid to form microfibers and submicron fibers ranging from about 0.1 to 50 microns, and preferably 0.2 to 35 microns.

As used herein, "meltfibrillated" may refer to a web produced by the melt fibrillation or melt fibrillating method.

As used herein, "meltfibrillated nonwoven" may refer to a meltfibrillated web bonded by one or more techniques to provide fabric integrity.

As used herein "melt blowing" may refer to a manufacturing process where a polymeric melt is extruded into a high-velocity hot gas stream to form microfibers ranging from about 0.5 to 10 microns.

As used herein, "meltblown" may refer to a web produced by the melt blowing method.

As used herein, "nonwoven" or "nonwoven fabric" may refer to a fabric material that contains fibers or filaments that are randomly dispersed in all directions. The fibers or filaments may be bonded together by chemical, mechanical, heat, or solvent treatment to provide fabric integrity, excluding weaving, knitting, or paper making.

As used herein, "nozzle" may refer to a device designed to control the direction or characteristics of a fluid flow as it exits an enclosed chamber or pipe.

As used herein, "nozzle set" is a generic term which may refer to two or more melt fibrillating nozzles or two or more spin laying spinnerets, without distinction.

As used herein, "point bonding" may refer to using heat and pressure in a discrete predetermined pattern to bind thermoplastic fibers to form a nonwoven fabric.

As used herein, "polymeric" may refer to a substance that is related to or consists of a polymer.

As used herein, "SMS" may refer to a multilayered nonwoven fabric comprised of a base Spunlaid nonwoven, one or more Meltblown middle webs, and a Spunlaid top web, which are then consolidated.

As used herein, "SNS" may refer to a multilayered nonwoven fabric comprised of a base Spunlaid nonwoven, one or more Nanofiber (submicron) middle webs, and a top Spunlaid nonwoven, which are then consolidated.

As used herein, "spin laying" or "spinning" may refer to a method of forming a web in which a polymeric melt or solution is extruded through spinnerets to form fibers or filaments which are laid down on a moving screen.

As used herein "spinneret" may refer to a disc or screen containing many small holes through which molten polymer is extruded to form fibers or filaments.

As used herein, "spunbond" may refer to a spunlaid web that has undergone calender bonding to provide fabric integrity.

As used herein, "spunlaid" may refer to a web produced by the spin laying method.

As used herein, "spunlaid nonwoven" may refer to a spunlaid web bonded by one or more techniques to provide fabric integrity.

As used herein, "web" may refer to a porous sheet of entangled fibers.

As used herein, "wet forming" may refer to a web produced by filtering an aqueous suspension of fibers onto a screen belt or on to a perforated drum.

The present invention is directed to articles comprising polymeric submicron fiber webs which serve as a barrier, wipe, or sorbent material or may have additional potential applications and uses. Non-limiting examples of preferred articles may include respiratory protective devices, surgical gowns, wound dressings, and medical barriers, wipes and sorbents. Additional non-limiting examples of articles may include personal hygiene products and cleansing articles, and industrial barriers, wipes, and sorbents.

In an embodiment, this document presents a description of the multilayered nonwoven fabrics, methods, and apparatus for manufacturing the multilayered nonwoven fabrics, and articles made from the multilayered nonwoven fabrics.

The present invention is directed to articles comprising polymeric submicron fiber webs which serve as a barrier, wipe, or sorbent material or may have additional potential applications and uses. Non-limiting examples of preferred articles may include respiratory protective devices, surgical gowns, wound dressings, and medical barriers, wipes and sorbents. Additional non-limiting examples of articles may include personal hygiene products and cleansing articles, and industrial barriers, wipes, and sorbents.

In an embodiment, this document presents a description of the multilayered nonwoven fabrics, methods, and apparatus for manufacturing the multilayered nonwoven fabrics, and articles made from the multilayered nonwoven fabrics.

The placement of submicron fibers in the 0.1 to 0.9-micron range between spunbond fabrics is known in the prior art. Such a process is multi-stage in that the spunbond layers must be spunlaid and bonded, the submicron layer must be produced, preferably by melt fibrillation, and then the spunbond layers and submicron layer must be layered together. The layers may then be ultrasonically bonded.

In contrast, a multilayered fabric produced using a novel single-stage process of laying down meltfibrillated or spunlaid fibers before and after the laydown of submicron fibers on a moving conveyor belt thus creating a loose web (which may then be bonded) may have significant advantages, especially as it relates to manufacturing costs, improved article performance, efficient use of raw materials and recycling of scraps or articles. As a non-limiting example, larger fibers may be meltfibrillated or spin laid onto a moving surface, followed by the laydown of submicron fibers, followed by the melt fibrillating or spin laying of a second larger fiber layer resulting in a loose web which may then be consolidated by calendaring, thermal point bonding or any other means that does not harm the integrity or function of the resulting multilayered nonwoven fabric.

In an embodiment, use of one or more hydroentangled nonwoven layers in the multilayered nonwoven fabric may provide characteristics that are more suitable for medical fabrics and other users. As non-limiting examples, multilayered fabrics comprising at least one layer of hydroentangled nonwovens may result in greater wearability through improved loft, softness, and bending length, without loss of tensile or tear strength.

However, hydroentanglement of al loose web containing submicron fibers, as described above, may damage or destroy the impermeable nature and other desired characteristics of submicron fiber webs. If one or both exterior layers of the multilayered fabric is to be a hydroentangled nonwoven for the benefit of such, then those layers must be formed and entangled prior to layering with the submicron fiber.

The use of melt fibrillation in the manufacturing process rather than spin laying or melt blowing may have significant advantages, especially as it relates to manufacturing costs, range of usable polymers, and uniformity and range of fiber diameters. As a non-limiting example, the procurement and maintenance cost of melt fibrillating machinery, as well as space requirements for installation and operation, may be significantly reduced over that of melt blowing or spin laying machinery. As additional non-limiting examples, the number of usable polymers may be significantly increased over that of melt blowing, allowing a more tailored selection of polymers to article use and/or lifecycle, resulting in better utilization of renewable and nonrenewable polymers, while the amount of polymer required for comparable levels of filtration or sorption may be reduced by up to 50 percent over that of melt flowing, due to the finer and more uniform fiber diameters achieved with melt fibrillation.

While a single-stage process of laying down larger meltfibrillated fibers before and after the laydown of submicron fibers is preferred, it is recognized that manufacturing restraints, as well as other factors, may require larger meltfibrillated webs to be formed prior to layering with the submicron fiber.

It is generally accepted that polymer lifecycle goals should address the economical preservation of resources, and efficient extension of useful life, prior to safe and efficient burning as an energy source, or decomposition into nonpolluting material. The present invention may allow the manufacture of fibers from a broad selection of natural, synthetic, and recycled polymers, including petroleum-and plant-based, allowing polymer selection based on article lifecycle. As a non-limiting example, "use and discard" articles may be produced from renewable polymers such as plant-based PLA, allowing safe and efficient burning of used articles as an energy source, or decomposition into nonpolluting material, while preserving nonrenewable resources. As an additional non-limiting example, "use and recycle" articles may be produced from more robust, nonrenewable polymers such as petroleum-based PET, which may be recycled may times prior to safe and efficient burning as an energy source.

In an embodiment, herein is described a novel process capable of producing a multilayered nonwoven fabric in a single step but which is also flexible enough to produce a mutlilayered fabric comprising one or more layers of a hydroentangled and/or meltfibrillated nonwoven fabric in multiple steps.

In a non-limiting example, the process herein described may be operable to lay a submicron fiber web on an already formed hydroentangled and/or meltfibrillated nonwoven layer, followed by either 1) layering a second already formed hydroentangled and/or meltfibrillated nonwoven over the submicron fiber, or 2) melt fibrillating or spinning of a larger fiber layer over the submicron fiber, or 3) leaving the submicron layer exposed. The layers may then be consolidated, preferably by ultrasonic welding, but also by calender bonding.

This novel process may lay down a submicron layer on top of a base layer, which may then be covered with a top layer as required by article specifications. The base layer may be comprised of either a hydroentantled and/or meltfibrillated nonwoven, or loose meltfibrillated or spunlaid polymeric fibers, or in combination, as required by article specifications. The jydroentalgled nonwoven may form the outermost layer of a composite base layer. Atop layer, if required, may also be comprised of either a hydroentangled, meltfibrillated and/or spunlaid nonwoven, or loose meltfibrillated or spunlaid polymeric fibers, or in combination, as required by article specifications. The hydroentangled nonwoven may form the outermost layer of a composite top layer. The resulting web may then be consolidated by ultrasonic welding or calendering.

In this process, hydroentanglement, without loss of tensile or tear strength, increases the loft, softness, and bending length of the resulting fabric, while manufacturing restraints may influence the production stage of melt fibrillation. However, the cost of manufacturing may increase as a result of a two-stage process such as production of jydroentangled and/or meltfibrillated nonwovens prior to layering the submicron fiber between outer layers. Conversely, a one-stage process where larger meltfibrillated or spunlaid fibers are laid down on the same conveyor belt as the submicron fibers reduces manufacturing costs, although loft, softness and bending length are sacrified, or manufacturing restraints must be overcome.

In an embodiment, three primary or macro variations to the process for manufacturing a multilayered nonwoven fabric containing submicron fibers are described herein.

They are:
1. Hydroentangled or Meltfibrillated Fabric-Submicron Web-Hydroentangled or Meltfibrillated Fabric (Fabric-Web-Fabric):

In this variation, the resulting fabric may have a higher manufacturing cost because both outside layers are produced in a separate manufacturing stage prior to layering. The fabric may have higher levels of loft and bending length, and improved softness on both sides because outer layers may be hydroentangled nonwovens. Additionally, the fabric may have off-setting lower manufacturing cost because outer layers may be meltfibrillated nonwovens.

2. Hydroentangled or Meltfibrillated Fabric-Submicron Web-Meltfibrillated or Spunlaid Web (Fabric-Web-Web):

In this variation, the resulting fabric may have medium manufacturing cost because one outside layer is produced in a separate manufacturing stage prior to layering. The fabric may have medium levels of loft and bending length, and improved softness of one side because one outer layer may be a hydroentangled nonwoven. Additionally, the fabric may have off-setting lower manufacturing cost because outer layers may be meltfibrillated nonwovens and/or webs.

3. Meltfibrillated or Spunlaid Web-Submicron Web-Meltfibrillated or Spunlaid Web (Web-Web-Web):

In this variation, the resulting fabric may have a lower manufacturing cost because all layers may be laid in a one-stage process. The fabric may have lower levels of loft and bending length, and no improved softness on either side because none of the layers may be hydroentangled nonwovens. Additionally, the fabric may have additional lower manufacturing cost because outer layers may be meltfibrillated webs.

In the mnemonic for theses three variation (e.g., fabric-web-fabric), 'fabric' may refer to a nonwoven layer that was produced in a prior process stage and then fed into the fabric manufacturing process to produce the multilayered nonwoven and 'web' may refer to a layer that is laid during the fabric manufacturing process.

The resulting nonwoven fabric may be of a single polymer or a composite of polymers, may include petroleum-based, plant-based or recycled polymers, may include additives, may include additional layers of polymeric fibers that are neither hydroentangled nor comprised predominately of submicron fibers, and may be consolidated by any means that does not harm the integrity or function of the resulting fabric. As non-limiting examples, the resulting fabric may be consolidated by ultrasonic welding or by calendaring.

The polymeric submicron fibers, having a diameter of less than 1 micron, must comprise a significant number of the fibers in at least one submicron fiber layer of a compound nonwoven fiber web. The nonwoven fiber web may have a hydrohead to basis weight ration of greater than about 10 mbar/gsm. The submicron fibers may be produced from a melt fibrillation process.

Figure 4A:
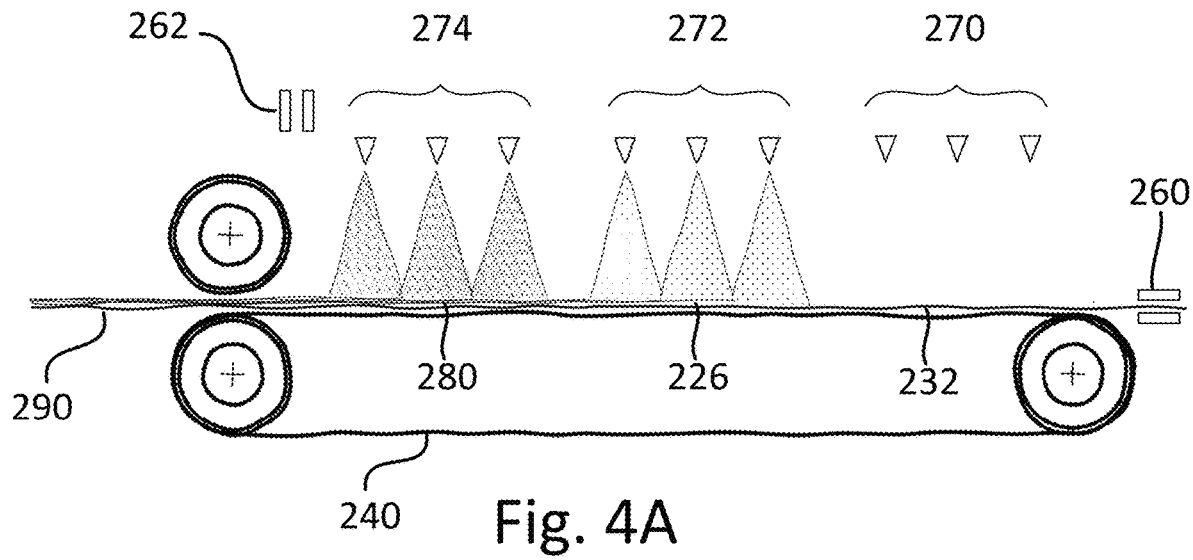
FIG. 4A is a view of an apparatus layering submicron fiber webs between a hydroentangled or meltfibrillated nonwoven base layer and a meltfibrillated or spunlaid web top layer consistent with certain embodiments of the present invention.
Figure 4B:
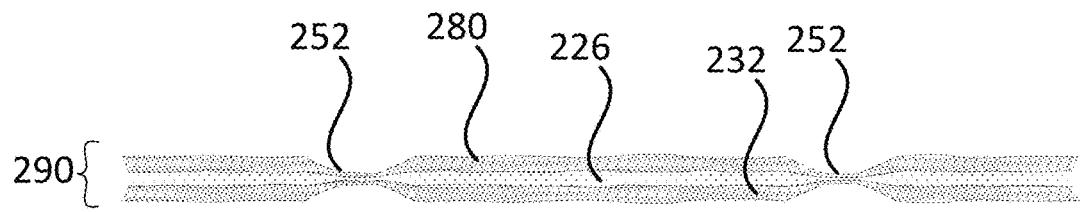
FIG. 4B is a view of the resulting multilayered nonwoven fabric resulting from FIG. 4A consistent with certain embodiments of the present invention.
Figure 5A:
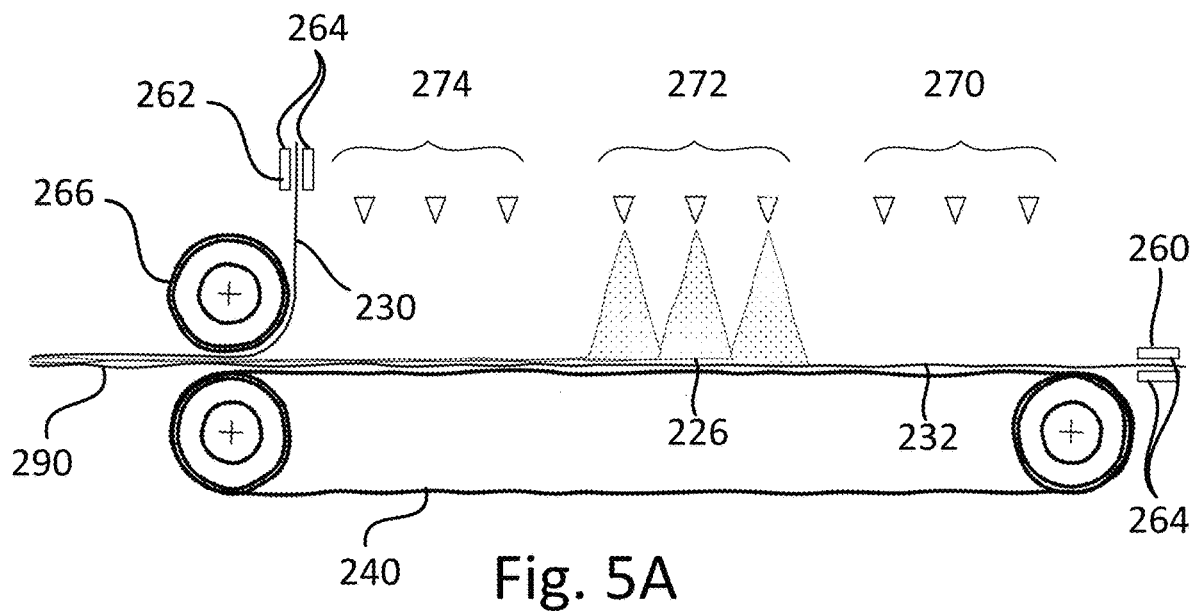
FIG. 5A is a view of an apparatus layering submicron fiber webs between hydroentangled or meltfibrillated nonwovens consistent with certain embodiments of the present invention.
Figure 5B:
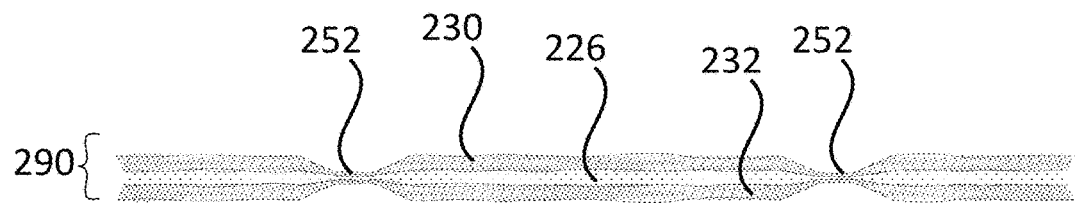
FIG. 5B is a view of the resulting multilayered nonwoven fabric resulting from FIG. 5A consistent with certain embodiments of the present invention.

In a first non-limiting example, one of more layers of submicron polymeric webs are laid, preferably through melt fibrillation, on a moving base comprised of a hydroentangled and/or meltfibrillated nonwoven, followed by the laydown of a top layer comprised of either i) a second jydroentangled and/or meltfibrillated nonwoven, as shown in FIG. 5A and FIG. 5B, or ii) meltfibrillated or spunlaid polymer, as shown in FIG. 4A and FIG. 4B, or iii) a spunlaid nonwoven as a substitute for the hydroentangled and/or meltfibrillated nonwoven as shown in FIG. 5A and FIG. 5B. The entire web may then be consolidated.

Figure 3A:
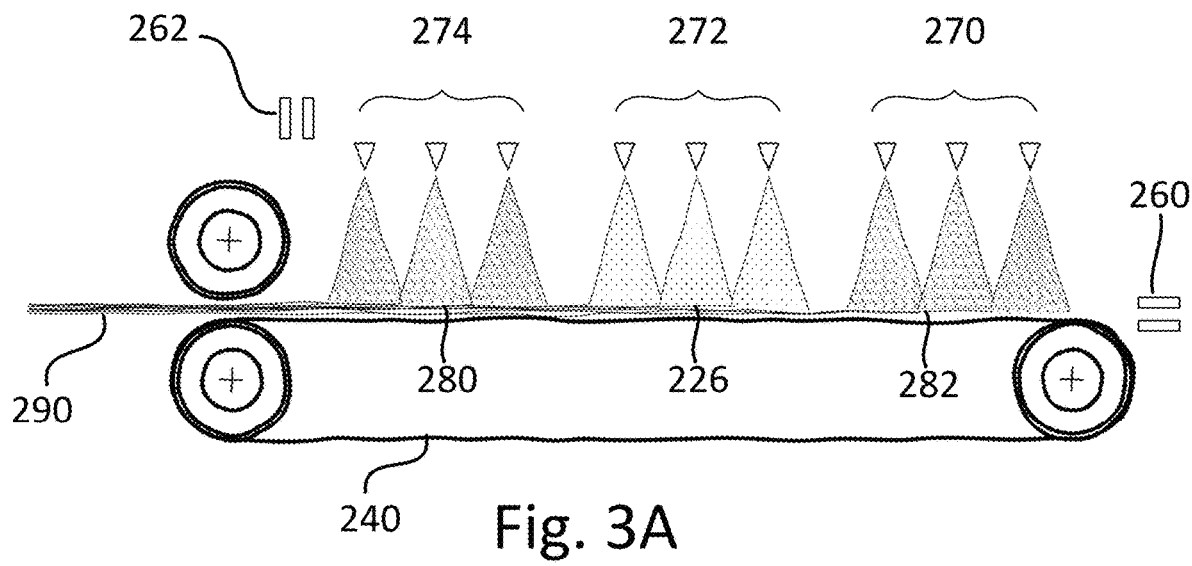
FIG. 3A is a view of an apparatus layering submicron fiber webs between meltfibrillated or spunlaid fiber webs consistent with certain embodiments of the present invention.
Figure 3B:
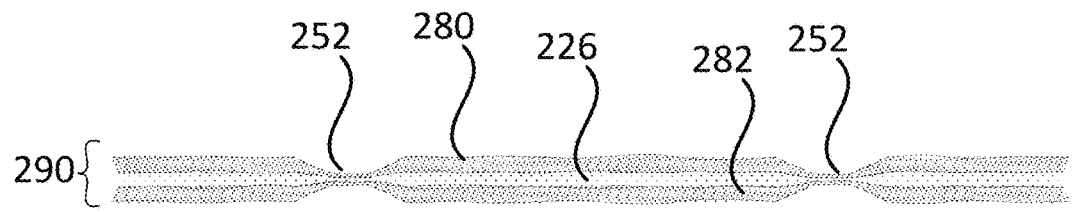
FIG. 3B is a view of the resulting multilayered nonwoven fabric resulting from FIG. 3A consistent with certain embodiments of the present invention.

In a second non-limiting example, one or more layers of submicron polymeric webs are laid, preferably through melt fibrillation, on meltfibrillated or spunlaid polymer web resting on a moving base, followed by the laydown of a top layer comprised of a second meltfibrillated or spunlaid polymer, as shown in FIG. 3A and FIG. 3B. The entire web may then be consolidated.

In an embodiment, the novel process creates unique and novel fabrics that are distinct from SMS (Spunlaid/Meltblown/Spunlaid) fabrics through the use of submicron fibers instead of microfibers. This novel process allows the manufactured fabric to use submicron fibers instead of meltblown microfibers to permit improved filtration without an electrostatic charge resulting in longer shelf life and use life, and improved sorption and wipe performance due to the increased surface area of submicron fibers. This is not to say submicron fibers do not benefit from electrostatic charges. In an embodiment, articles manufactured from the described fabrics may utilize an electrostatic charge to improve filtration. Further, the use of submicron fibers instead of meltblown microfibers may reduce the amount of polymer used in manufacture by up to 50 percent, while achieving comparable levels of filtration or sorption.

In an embodiment, the use of melt fibrillation instead of melt blowing may reduce manufacturing power consumption by about 75% and may allow a broader range of polymers or composites to be used in the manufacturing process, to include petroleum-based, plant-based or recycled materials, thus improving the manufacture and disposal aspects of the resulting fabric.

In an embodiment, the use of melt fibrillation instead of melt blowing facilitates in-process recycling of article manufacturing scraps when a polymer not suitable for melt blowing is desired and all fabric layers are comprised of the same polymer composition; specifically, the scraps may be re-introduced to the process through a hopper-extruder combination that feeds molten polymers into one or more of the web laydown stations in the process.

In an embodiment, the use of melt fibrillation instead of melt blowing facilitates post-consumer recycling of articles when a polymer not suitable for melt blowing is desired, and all layers are comprised of the same polymer composition, following removal of article components comprised of other polymers or materials.

Additionally, the use of melt fibrillation may significantly reduce the requirement to remove ambient moisture from recycled PET prior to melting and formation into new fabrics, an important cost saving and ease of processing factor as compared to other methods of manufacture.

In an embodiment, the novel process herein described creates unique and novel fabrics that are distinct from SMS and SNS (Spunlaid/Nanofiber/Spunlaid) fabrics through the use of at least one hydroentangled nonwoven layer instead of spunlaid nonwoven layers. This use of at least one hydroentangled nonwoven layer in the novel fabric results in greater wearability through improved loft, softness and bending length, without loss of tensile or tear strength.

The resulting greater loft from the use of at least one hydroentangled nonwoven layer instead of spunlaid nonwoven layers may reduce the amount of polymer required to achieve certain desired characteristics of the fabric. As non-limiting examples, the required amount of raw materials in the outer layers necessary to protect the structural integrity of the inner submicron fibers or to provide the feeling of substance, or materiality to the wearer of an article, may be reduced over that of other nonwovens.

In an embodiment, the use of one or more meltfibrillated web layers in the multilayered nonwoven fabric rather than melt blowing or spunlaid web may have significant advantages, especially as it relates to manufacturing costs. In a non-limiting example, the procurement and maintenance cost of melt fibrillating machinery, as well as space requirements for installation and operation, may be significantly reduced over that of melt blowing or spin laying machinery.

The novel manufacturing process herein describes specifically differs from U.S. Pat. No. 9,464,369B2, which describes a submicron fiber layered between "spunbond". "Spunbond" implies i) a fabric-web-fabric process, thus excluding fabric-web-web or web-web-web processes, ii) a calendaring process of spunlaid fibers prior to the fabric-web-fabric process, rather than the hydroentanglement of fibers of any type, which may include meltfibrillated or spunlaid, as disclosed herein, and iii) the use of meltfibrillated nonwovens or webs in place of spunbond.

the novel process herein described may be implemented using a layering apparatus that comprises a plurality of laydown stations above a moving conveyor belt with layer feeder mechanisms on either side of the laydown stations to introduce pre-formed layers. As used herein, a laydown station may refer to one or more nozzles, or sets of nozzles in the application of melt fibrillating or one or more spinnerets, or sets o spinnerets in the application of spin laying, that lay polymeric material at the same time in order to create one layer of the multilayered nonwoven. The laydown stations and the layer feeder mechanisms may or may not extend across the full width of the moving conveyor belt, and may be arranged, adjusted, or operated in a manner which lays down or feeds layers of any width, equal to or less than the width of the moving conveyor belt, which itself has no minimum or maximum with other than what is mechanically feasible to maintain the structural integrity of the moving conveyor belt.

During any given production run, one or more of the laydown stations may be used to lay webs with the possibility that one or more of the laydown stations may be unused. The apparatus may comprise a moving conveyor belt to convey the layers through the apparatus and under the laydown stations. A first layer feeder mechanism may introduce a base layer from a previous stage into the apparatus such that the moving conveyor belt may carry the base layer under the one or more laydown stations. A second layer feeder mechanism may be positioned at the end of the moving conveyor belt and past the one or more laydown stations. The second layer feeder mechanism may introduce a top layer from a previous stage into the apparatus such that the apparatus may cover the layers laid by the one or more nozzle sets at each laydown station. The moving conveyor belt may carry all layers through the apparatus and forward to a consolidation stage.

In an embodiment, an individual layer feeder mechanism may comprise one or more fabric guides, one or more rollers, or both. Some or all of the one or more rollers may be motorized to assist in moving the layer being fed through the apparatus. Although two-layer feeder mechanisms are shown in the figures, this disclosure does not limit in any way the number of layer feeder mechanisms feeding into the apparatus. As a non-limiting example, one or more additional layer feeder mechanisms may be positioned between the one or more laydown stations to introduce one or more additional layers from previous stages if the specification for the multilayered nonwoven fabric demands such layering.

In some embodiments, the apparatus may comprise thermal bonding machinery in the form of calendaring, ultrasonic welding, or both, such that the fabric leaving the apparatus is durable. Alternatively, the layers may be consolidated by separate bonding machinery after exiting the layering apparatus.

In a non-limiting example, three nozzle sets, each of which comprises a laydown station, can be seen in FIG. 5A, with the first laydown station on the right side of the diagram and the third laydown station on the left side of the diagram as the moving conveyor belt moves to the left. A second laydown station may lay a submicron fiber on the first layer in between the first and third laydown stations.

In an embodiment, two layer feeder mechanisms are represented in FIG. 5A, with the first layer feeder mechanism feeding a base layer of hydroentangled and/or meltfibrillated nonwoven fabric in at the right side of the diagram and a second layer feeder mechanism feeding a top layer of hydroentangled and/or meltfibrillated nonwoven fabric in at the left side of the diagram as the moving conveyor belt moves to the left. One set of nozzles, comprising a laydown station, lays a submicron fiber on the first hydroentangled and/or meltfibrillated nonwoven layer in between the first and second layer feeder mechanisms.

Any or all of the laydown stations and any or all of the layer feeder mechanisms may be used simultaneously. If two or more laydown stations are used at the same time, multiple layers may be laid as a first laydown station lays a first layer which moves with the moving conveyor belt to where a second laydown station lays a second layer on top of the first layer as the first layer passes beneath the second laydown station. Additional laydown stations, comprised of additional nozzle sets (i.e., a third, a fourth, etc.), may lay additional layers on top of those already laid down as the multilayered nonwoven moves with the moving conveyor belt.

The number of laydown stations, comprising one or more additional nozzle sets for each laydown station, are unlimited and may determine the maximum number of layers in the final multilayered nonwoven. In a non-limiting example, with three laydown stations, a multilayered nonwoven comprising a maximum of five layers could be manufactured in the following manner. In a first step, a first layer may be fed in using a first layer feeder mechanism, as a second step, a second layer may be laid using a first laydown station. In a third step, a third layer may be laid using a second laydown station. In a fourth step, a fourth layer may be laid using a third laydown station, and in a fifth step, a fifth layer may be fed in using a second layer feeder mechanism. These five steps successfully producing a five-layer fabric composed of nonwoven web and fabric layers.

In this non-limiting example, an apparatus may be set up to not feed layers in using the layer feeder mechanism and to instead only lay webs using three of the laydown stations. The resulting multilayered nonwoven would be of the web-web-web variation described above.

Where this document mentions hydroentanglement the process may include both hydroentanglement of a continuous fiber (where loops in a continuous fiber are forced beneath other portions of the continuous fiber to entangle the fiber) and hydroentanglement of non-continuous fibers (where the ends of non-continuous fibers are forced beneath other fibers to entangle the fibers).

Where this document mentions layer feeder mechanisms, there is no limitation on the source of the nonwoven fabrics and/or webs introduced by the layer feeder mechanisms. Non-limiting sources may include any combination of nonwoven fabrics and/or webs fed into the layer feeder mechanisms immediately following their formation within the same production line or from unwinding machines as necessitated by their being wound after earlier formation.

The layering apparatus and process may be adjusted to produce multilayered nonwovens having three or more layers that are produced separately (i.e., in a previous stage) by introducing more layer feeder mechanisms. As a non-limiting example, at the start of production—corresponding to the right side of FIG. 3A, FIG. 4A, and FIG. 5A—two successive layer feeders might feed a bottom and middle layer in. The two layers may ride the moving conveyor belt beneath the laydown stations without laying down any additional layers and may have a third layer introduced from the layer feeders near the end of production—corresponding to the left side of FIG. 3A, FIG. 4A, and FIG. 5A. The three layers may then be consolidated. Additional layer feeders may be interspersed between laydown stations to permit any combination of pre-made layers with newly meltfibrillated or spun layers.

Figure 1B:
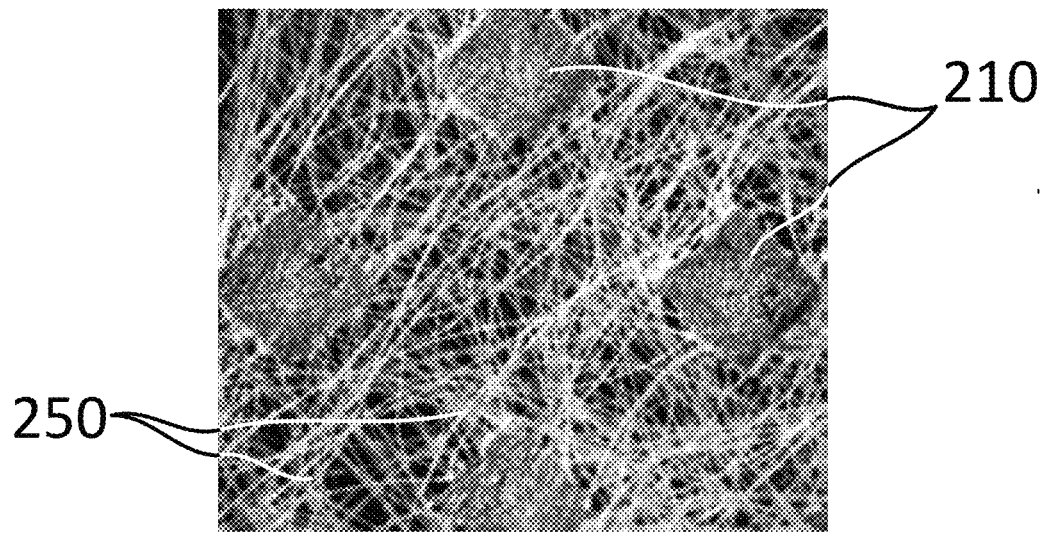
FIG. 1B is a view of a plurality of spunlaid fibers that have been thermally bonded consistent with certain embodiments of the present invention.

Turning now to FIG. 1A and FIG. 1B, the figures show a microscopic comparison between a plurality of spunlaid fibers 210 that have been hydroentangled in FIG. 1A and a plurality of spunlaid fibers 210 with calendered bonds 250 in FIG. 1B. Hydroentanglement of fibers results in greater loft, softness and bending length, while calender or thermal bonding of fibers results in thinner, smoother fabrics with less bending length.

Figure 2A:
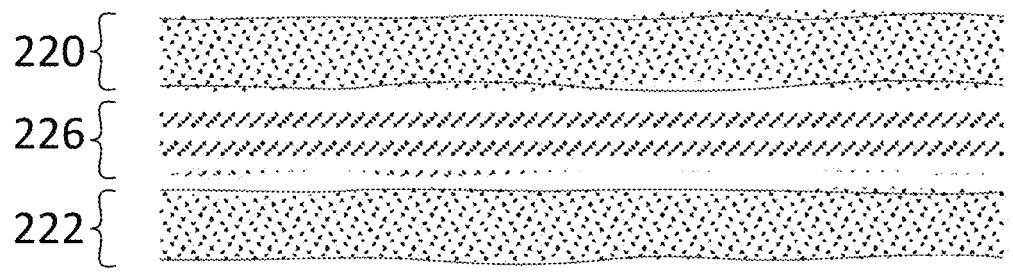
FIG. 2A is a view of a plurality of spunlaid fibers that have been thermally bonded consistent with certain embodiments of the present invention.

Turning now to FIG. 2A, FIG. 2B, FIG. 2C, and FIG. 2D, the figures illustrate detail views of fabric layering. FIG. 2A illustrates layering similar to U.S. Pat. No. 9,464,369B2 with a submicron web layer 226 between a spunbond top layer 220 and a spunbond base layer 222. Spunbond implies a spunlaid web that has been thermally bonded (bonding to provide fabric integrity by any means, to include thermal bonding or hydroentanglement, is represented in FIG. 2A through FIG. 2D by the solid lines at the top and bottom of a layer). The thermal bonding of the top and base layers necessitates more than one stage.

Figure 2B:
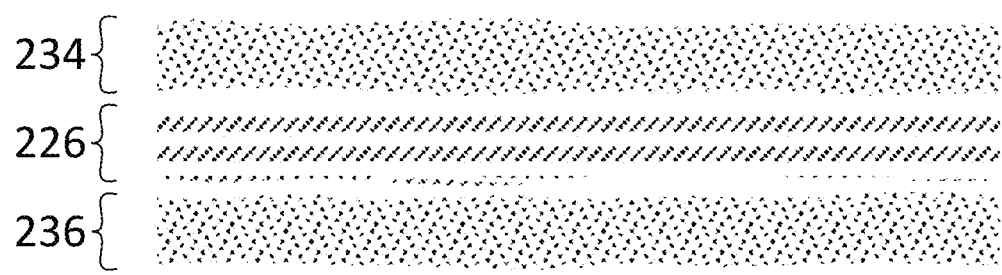
FIG. 2B is a view of layers of a multilayered web consistent with certain embodiments of the present invention and illustrating a submicron fiber web layer between a meltfibrillated or spunlaid web top layer and a meltfibrillated or spunlaid web base layer consistent with certain embodiments of the present invention.
Figure 2C:
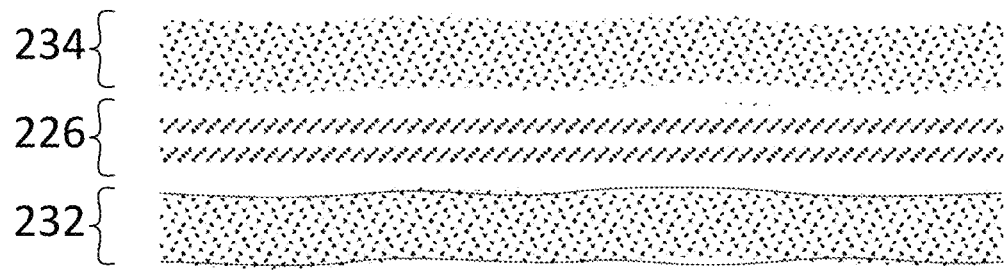
FIG. 2C is a view of layers of a multilayered web and illustrating a submicron fiber web layer between a meltfibrillated or spunlaid web top layer and a hydroentangled or meltfibrillated nonwoven base layer consistent with certain embodiments of the present invention.
Figure 2D:
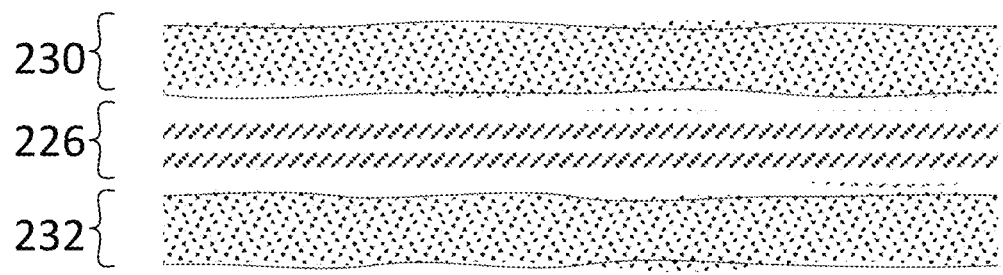
FIG. 2D a view of layers of a multilayered nonwoven fabric and illustrating a submicron fiber web layer between a hydroentangled or meltfibrillated nonwoven top layer and a hydroentangled or meltfibrillated nonwoven base layer consistent with certain embodiments of the present invention.

FIG. 2B, FIG. 2C, and FIG. 2D illustrate layering obtained using the processes and apparatus described herein. FIG. 2B illustrates a submicron web layer 226 between a meltfibrillated or spunlaid web top layer 234 and a meltfibrillated or spunlaid web base layer 236. Using the processes and apparatus described herein, this layering can be performed in a single stage.

FIG. 2C illustrates a submicron web layer 226 between a meltfibrillated or spunlaid web top layer 234 and a hydroentangled or meltfibrillated nonwoven base layer 232. This again demonstrates great flexibility to layer the hydroentangled or meltfibrillated nonwoven base layer 232 created in a previous stage with the submicron web layer 226 and the melt fibrillated or spunlaid web top layer 234 laid one after the other on the hydroentangled or meltfibrillated nonwoven base layer 232.

FIG. 2D illustrates a submicron web layer 226 between a hydroentangled or meltfibrillated nonwoven top layer 230 and a hydroentangled or meltfibrillated nonwoven base layer 232. Although requiring an additional stage to create the hydroentangled or meltfibrillated nonwoven top layer 230 and the hydroentangled or meltfibrillated nonwoven base layer 232, the processes and apparatus described herein are flexible enough to create this layering.

Turning now to FIG. 3A, the figure illustrates the layering of submicron fibers between meltfibrillated or spunlaid fibers. A first laydown station containing nozzle sets 270 may melt fibrillate or spin lay an extruded polymeric base layer 282 on a moving conveyor belt 240. A second laydown station 272 may melt fibrillate a submicron web layer 226 on top of the extruded polymeric base layer 282. A third laydown station 274 may melt fibrillate or spin lay an extruded polymeric top layer 280 over the submicron web layer 226. Because all layers are laid here, a first layer feeder mechanism 260 and a second layer feeder mechanism 262 are idle. A resulting multilayered web 290 may now be consolidated into a multilayered nonwoven. In some embodiments, consolidation may be performed within the apparatus that layers the web. In other embodiments, consolidation may be performed by external machinery following layering.

Turning now to FIG. 3B, the figure illustrates the resulting multilayered nonwoven 290 of FIG. 3A after consolidation. The extruded polymeric top layer 280, the submicron web layer 226, and the extruded polymeric base layer 282 may be consolidated by bonds 252. As non-limiting examples, the bonds 252 may be spot, stitched, or continuous ultrasonic welds or thermal bonds.

Turning now to FIG. 4A, the figure illustrates the layering of submicron fibers between a hydroentangled or meltfibrillated nonwoven base and a meltfibrillated or spunlaid top layer. A hydroentangled or meltfibrillated nonwoven base layer 232 may be fed onto the moving conveyor belt 240 via the first layer feeder mechanism 260. The second laydown station containing nozzle sets 272 may melt fibrillate the submicron web layer 226 on top of the hydroentangled or meltfibrillated nonwoven base layer 232. The third laydown station 274 may melt fibrillate or spin lay the extruded polymeric top layer 280 over the submicron web layer 226. The first laydown station 270 and the second layer feeder mechanism 262 may be idle. The resulting multilayered nonwoven-web combination 290 may now be consolidated.

Turning now to FIG. 4B, the figure illustrates the resulting multilayered nonwoven 290 of FIG. 4A after consolidation. The extruded polymeric top layer 280, the submicron web layer 226, and the hydroentangled or meltfibrillated nonwoven base layer 232 may be consolidated by the bonds 252.

Turning now to FIG. 5A, the figure illustrates the layering of submicron fibers between hydroentangled or meltfibrillated nonwovens. The hydroentangled or meltfibrillated nonwoven base layer 232 may be fed onto the moving conveyor belt 240 via the first layer feeder mechanism 260. The second laydown station containing nozzle sets 272 may melt fibrillate the submicron web layer 226 on top of the hydroentangled or meltfibrillated nonwoven base layer 232. A hydroentangled or meltfibrillated nonwoven top layer 230 may be fed on top of the submicron web layer 226 via the second layer feeder mechanism 262. The first laydown station 270 and the third laydown station 274 may be idle. Note that the first layer feeder mechanism 260 and the second layer feeder mechanism 262 may comprise the one or more fabric guides 264, one or more rollers 266, or both. The resulting multilayered nonwoven 290 may now be consolidated.

Turning now to FIG. 5B, the figure illustrates the resulting multilayered nonwoven 290 of FIG. 5A after consolidation. The hydroentangled or meltfibrillated nonwoven top layer 230, the submicron web layer 226, and the hydroentangled or meltfibrillated nonwoven base layer 232 may be consolidated by the bonds 252.

Figure 6:
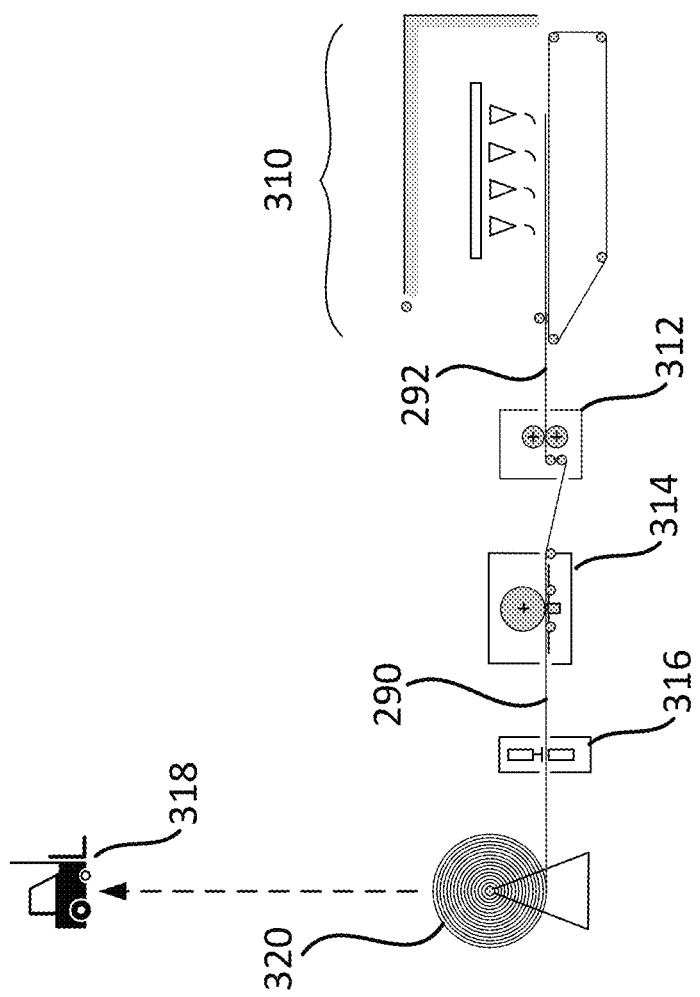
FIG. 6 illustrates an exemplary process for producing submicron fibers between larger fiber webs in a single stage consistent with certain embodiments of the present invention.

Turning now to FIG. 6, the figure illustrates an exemplary process for producing submicron fibers layered between larger fiber webs in a single stage. This corresponds to the web-web-web configuration described earlier in this document. A first layering or extruder apparatus 310 may produce a mixed laydown as shown in FIG. 3A and FIG. 3B. Non-consolidated layers 292 exiting the first extruder apparatus 310 may pass through a calender 312 and an ultrasonic welder 314 where the non-consolidated layers 292 may be consolidated by the calender 312, the ultrasonic welder 314, or both. The resulting multilayered nonwoven fabric 290 may pass through a first scanner 316 where quality control inspections may be performed and then on to an automatic slicer and horizontal winder 320. The resulting multilayered nonwoven fabric 290, now sliced and rolled, may then be moved to stock 318. Here the stock 318 comprises at least the concepts of shipping to customers, warehousing for later use, and conversion into products.

Figure 7:
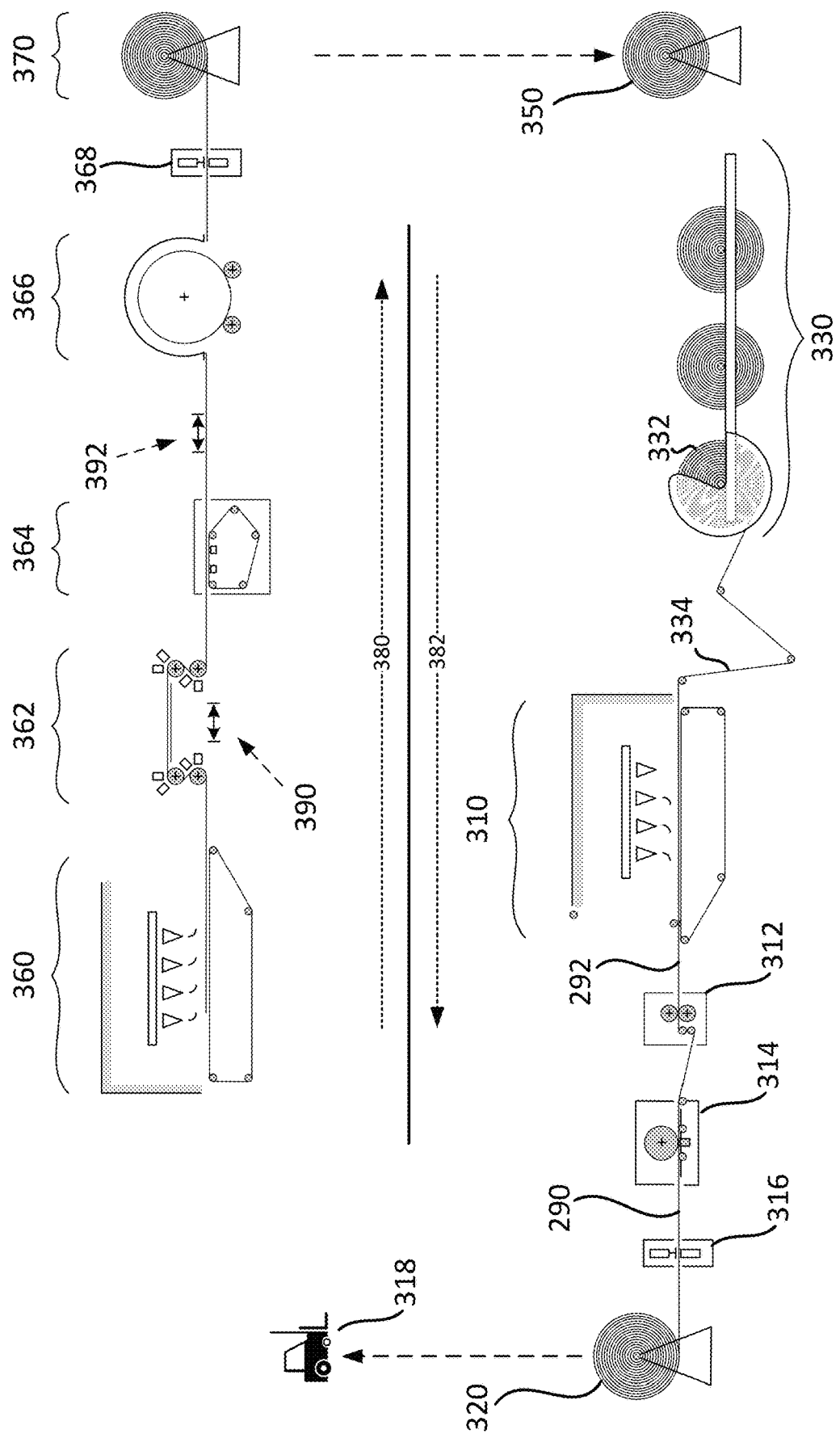
FIG. 7 illustrates an exemplary process for producing submicron fibers layered between a hydroentangled or meltfibrillated nonwoven base layer and a larger fiber web top layer consistent with certain embodiments of the present invention.

Turning now to FIG. 7, the figure illustrates an exemplary process for producing submicron fibers layered between a hydroentangled and/or meltfibrillated nonwoven base layer and a larger fiber web. This corresponds to the fabric-web-web configuration described earlier in this document. Differences between FIG. 7 and FIG. 6 may include: 1) the first extruder apparatus 310 produces a mixed laydown of submicron fibers and larger fibers onto a first inbound fabric 334, which may be a hydroentangled and/or meltfibrillated nonwoven produced in a separate stage. 2) the first inbound fabric 334 is fed into the first extruder apparatus 310 from a first synchronized automatic unwinder 330. Specifically, a lateral loader 350 may place a first inbound roll 332 into the first synchronized automatic unwinder 330 and the first inbound fabric 334 may pass from the first inbound roll 332 to the first extruder apparatus 310. 3) The hydroentangled and/or meltfibrillated nonwoven fed into the first extruder apparatus 310 as the first inbound fabric 334 may be produced by a larger fiber line 380, shown at the top of FIG. 7. Layering and consolidation to produce the resulting multilayered nonwoven 290 may be produced by a finishing line 382, shown at the bottom of FIG. 7.

The larger fiber line 380 may comprise a second layering or extruder apparatus 360 to lay down larger fibers, a hydroentanglement stage 362 to hydroentangle the larger fibers, a dewatering stage 364 to remove the bulk of the water introduced during the hydroentanglement stage 362, a through-air dryer 366 to dry the hydroentangled nonwoven, a second scanner 368 to perform quality control inspections, an automatic horizontal winder 370 to roll the hydroentangled or meltfibrillated nonwoven, or combinations thereof. The resulting roll of hydroentangled or meltfibrillated nonwoven may be passed to the finishing line 382 as shown in FIG. 7.

Figure 8:
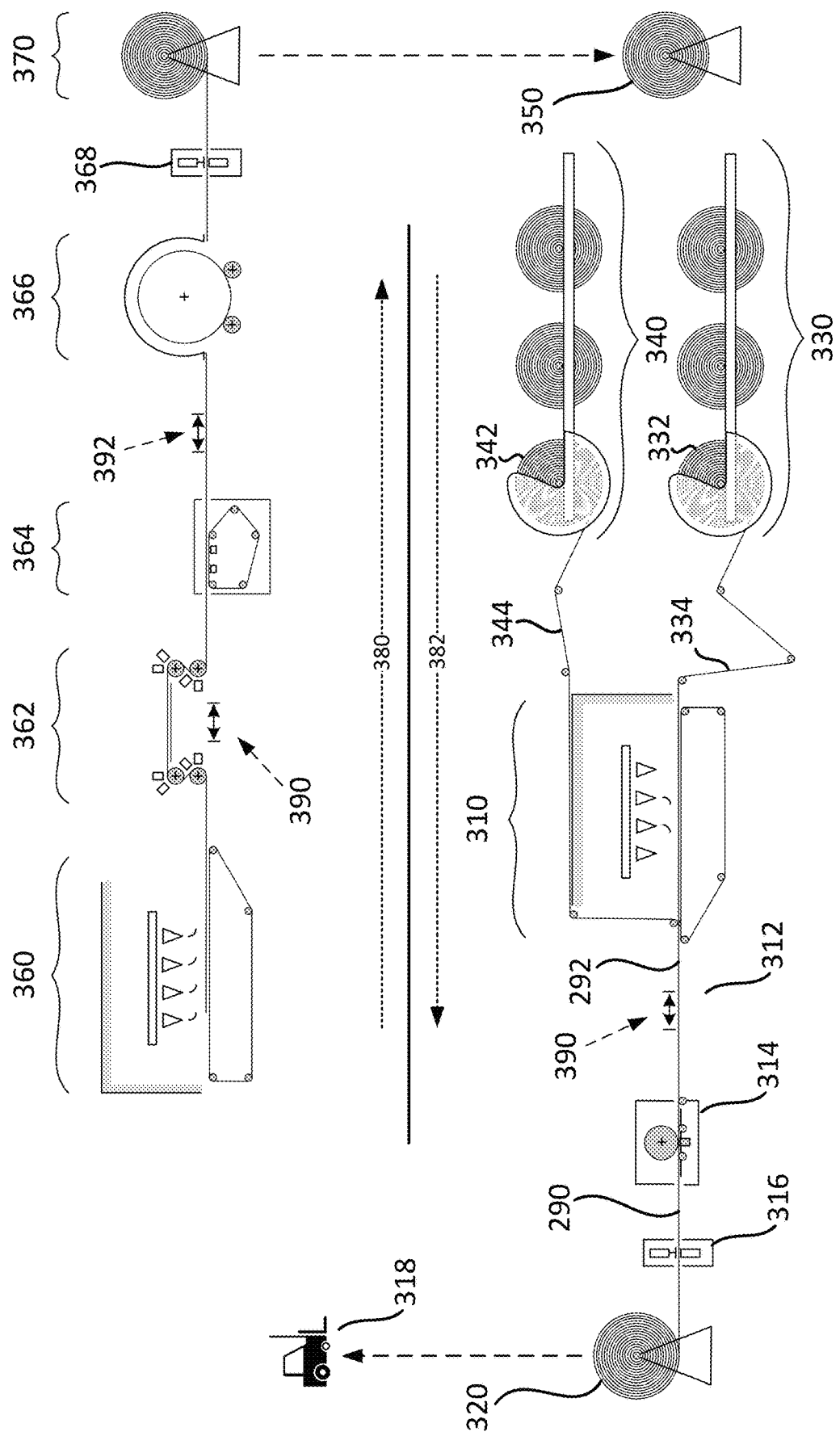
FIG. 8 illustrates an exemplary process for producing submicron fibers layered between a hydroentangled or meltfibrillated nonwoven base layer and a hydroentangled or meltfibrillated nonwoven top layer consistent with certain embodiments of the present invention.

Turning now to FIG. 8, the figure illustrates an exemplary process for producing submicron fibers multilayered between a hydroentangled and/or meltfibrillated nonwoven base layer and a hydroentangled and/or meltfibrillated nonwoven top layer. This corresponds to the fabric-web-fabric configuration described earlier in this document. Differences between FIG. 8 and FIG. 7 may include: 1) a second inbound fabric 344 is fed into the first extruder apparatus 310 from a second synchronized automatic unwinder 340. Specifically, the lateral loader 350 may place a second inbound roll 342 into the second synchronized automatic unwinder 340 and the second inbound fabric 344 may pass from the second inbound roll 342 to the first extruder apparatus 310. The second inbound fabric 344 may be fed into the first extruder apparatus 310 where it will be used to lay the top layer while the first inbound fabric 334 continues to be fed into the first extruder apparatus 310 as the bottom layer. The first extruder apparatus 310 may lay the submicron fibers on top of the first inbound fabric 334 and then lay the second inbound fabric 344 on top of both. 2) the calender 312 may be optional in the process of FIG. 8 because both outer layers of the non-consolidated layers 292 are hydroentangled and/or meltfibrillated nonwovens. The non-consolidated layers 292 may be consolidate by the ultrasonic welder 314 and then sliced and rolled by the automatic slicer and horizontal winder 320.

The hydroentangled and/or meltfibrillated nonwovens fed into the first extruder apparatus 310 as the second inbound fabric 344 may in a non-limiting manner, be produced by the larger fiber line 380, shown at the top of FIG. 8. The larger fiber line 380 may operate at twice the speed of the finishing line 382. As non-limiting examples, the larger fiber line 380 may operate at 260 meters per minute while the finishing line 382 operates at 130 meters per minute so that the larger fiber line 380 may produce sufficient material for both the first inbound fabric 334 and the second inbound fabric 344. Alternatively, the first inbound fabric 334 and the second inbound fabric 344 may come from two different larger fiber lines.

FIG. 7 and FIG. 8 also illustrate where one or more pieces of optional machinery may be inserted into the process when needed. As non-limiting examples, the optional machinery may be an optional calender 390 or an optional kiss-roll applicator 392. Conversely, the flexibility of the process allows for bypassing machinery when not needed. As a non-limiting example, the hydroentanglement stage 362, the dewatering stage 364 and the through-air dryer 366 may be bypassed when hydroentanglement is not required, as in the non-limiting case of producing meltfibrillated nonwovens bonded with an optional calender 390.

The exemplary processes depicted in FIG. 7 and FIG. 8 may be achieved in the described linear fashion, utilizing the larger fiber line 380 to produce hydroentangled or meltfibrillated nonwovens, followed by utilization of the finishing line 382 to produce the multilayer nonwoven fabric containing one or more submicron webs. Alternatively, the exemplary processes may be embodied by cycling the various manufacturing stages through a single larger fiber line 380, utilizing the flexibility of the extruder apparatus to laydown either submicron or larger fibers, or both, and the flexibility of the process to include or bypass machinery based on the requirement of each manufacturing stage. As a non-limiting example, the larger fiber line 380 may be first utilized to produce sufficient quantities of hydroentangled or meltfibrillated nonwovens, after which the larger fiber line 380, which may be augmented with an optional ultrasonic welding machine, is used in place of the finishing line 382 to produce the desired multilayer nonwoven fabric containing one or more submicron webs, corresponding to either the fabric-web-web or fabric-web-fabric configurations described earlier in this document. Additionally, the larger fiber line 380, which may be augmented with an optional calender 390 and/or an optional ultrasonic welding machine, may replace or compliment the exemplary process of finishing line 382 for producing submicron fibers layered between larger fiber webs in a single stage as illustrated by FIG. 6, corresponding to the web-web-web configuration described earlier in this document.

While certain illustrative embodiments have been described, it is evident that many alternatives, modifications, permutations and variations will become apparent to those skilled in the art in light of the foregoing description.

What is claimed is:

1. A process comprising:

creating one or more base layers comprised of pre-formed hydroentangled and/or meltfibrillated nonwoven fabrics and/or comprised of meltfibrillated and/or spunlaid fiber webs, on top of a moving conveyer belt;

creating, through melt fibrillating, one or more submicron fiber web layers on top of said one or more base layers traveling on said moving conveyor belt by extruding a polymeric melt through at least one of one or more melt fibrillation nozzles and a fluid stream associated with said polymeric melt emanating from an orifice of said at least one of one or more fibrillation nozzles;

subjecting said extruded polymeric melt to an entraining fluid flowing from a separate orifice of the at least one of said one or more fibrillation nozzles to form said one or more submicron fiber web layers comprising microfibers and submicron fibers formed on an upper surface of said one or more base layers;

covering the one or more submicron layers with one or more top layers comprised of pre-formed hydroentangled and/or meltfibrillated nonwoven fabrics and/or comprised of meltfibrillated and/or spunlaid fiber webs;

consolidating the one or more base layers, the one or more submicron layers, and the one or more top layers to form a multilayered nonwoven fabric containing the microfibers and submicron fibers in a single continuous process.

2. The process according to claim 1, where at least one of the one or more base and top layers is created via melt fibrillating or spin laying while traveling on the moving conveyor belt.

3. The process according to claim 1, where at least one of the one or more base and top layers is created by feeding in a hydroentangled and/or meltfibrillated nonwoven fabric while traveling on the moving conveyor belt.

4. The process according to claim 1, where at least one of the one or more base layers is overlain by one or more submicron fiber webs and is consolidated by bonding said one or more submicron fiber webs, having been overlain, to said one or more base layers.

5. The process according to claim 1, where at least one of the one or more top layers is positioned on top of said one or more submicron layers while the multilayered nonwoven fabric is traveling on the moving conveyor belt after melt fibrillating the one or more submicron layers.

6. The process according to claim 1, where at least one of the one or more top layers positioned on top of said one or more submicron layers is consolidated by bonding to said one or more base layers and said one or more submicron layers.

* * * * *